United States Patent [19]

Fox

[11] 4,304,492

[45] Dec. 8, 1981

[54] METHOD AND APPARATUS FOR DETECTING LEAKS IN FILTER BAGS OF A BAGHOUSE

[75] Inventor: Bill K. Fox, Kansas City, Mo.

[73] Assignee: Standard Havens, Inc., Kansas City, Mo.

[21] Appl. No.: 101,206

[22] Filed: Dec. 7, 1979

[51] Int. Cl.³ .......................................... G01N 21/00
[52] U.S. Cl. ................................. 356/439; 250/573; 250/575
[58] Field of Search ................ 356/438, 439; 250/564, 250/573, 575

[56] References Cited

U.S. PATENT DOCUMENTS 3,865,561 2/1975 Osborn ............................ 356/439 X

FOREIGN PATENT DOCUMENTS 551574 1/1980 Japan .................................... 356/439

*Primary Examiner*—John K. Corbin
*Assistant Examiner*—Matthew W. Koren
*Attorney, Agent, or Firm*—Lowe, Kokjer, Kircher, Wharton & Bowman

[57] ABSTRACT

A method and apparatus for use in an outside collection baghouse to identify defective filter bags. Each filter bag is equipped with a sensing head adjacent the open mouth of the bag. Each sensing head includes a pair of optical fibers having free ends disposed in the path of gas flowing out the bag mouth. Light is applied to one optical fiber in each pair and the amount of light reaching the other optical fiber is sensed to provide a measurement of the amount of light intercepted by particulate matter leaking through the bag.

10 Claims, 5 Drawing Figures

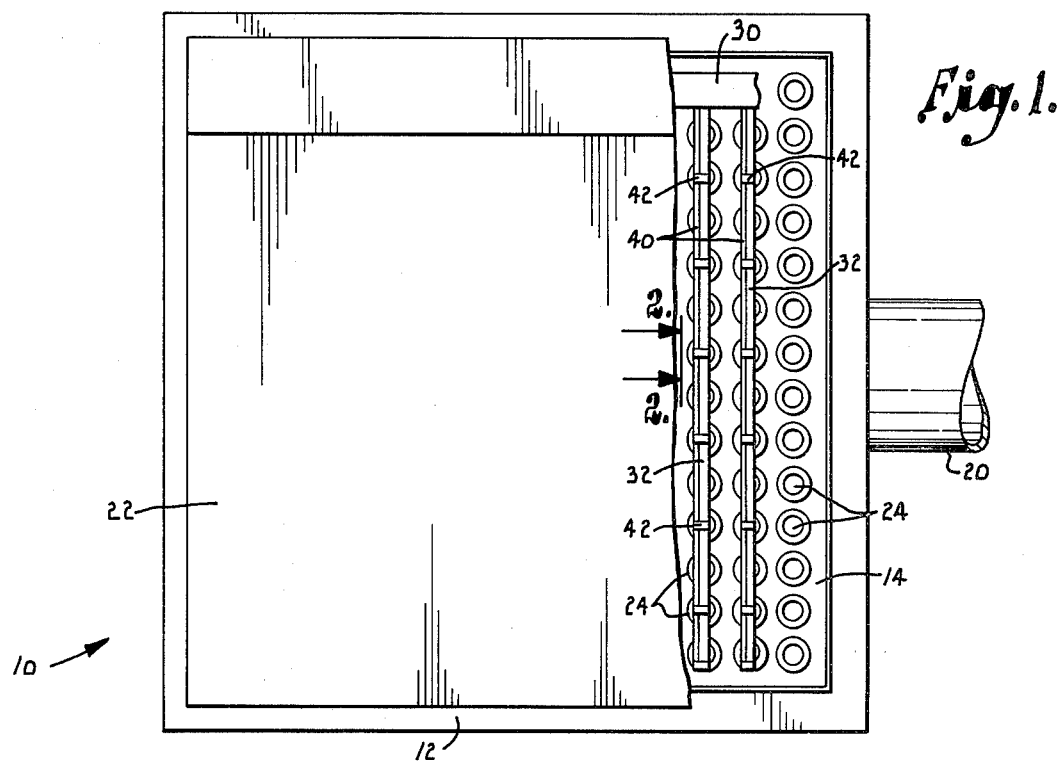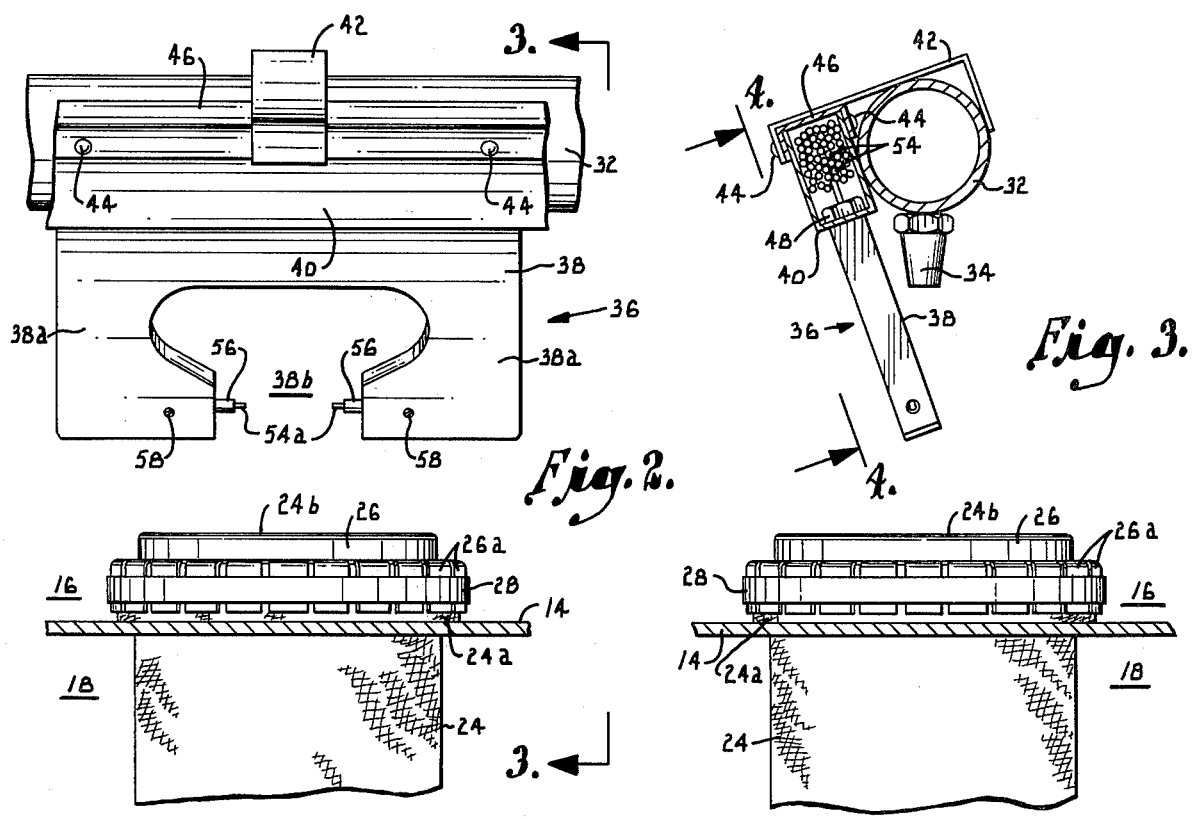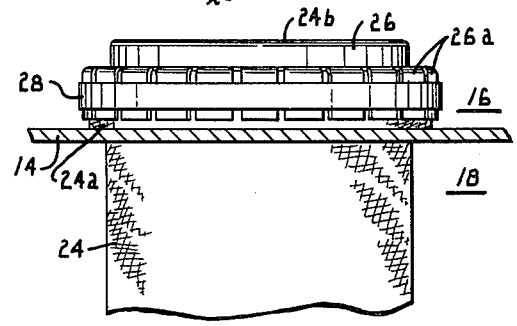

4,304,492

METHOD AND APPARATUS FOR DETECTING LEAKS IN FILTER BAGS OF A BAGHOUSE

BACKGROUND AND SUMMARY OF THE INVENTION

This invention relates in general to industrial baghouses and more particularly to a method and apparatus for detecting leaks in the individual filter bags of a baghouse.

Continuous emphasis on environmental quality has resulted in increasingly strenuous regulatory controls on industrial emissions. One technique which has proven highly efficient in controlling air pollution has been the separation of undesirable particulate matter from a gas stream by fabric filtration.

Such filtration is carried out in dust collection apparatus which is known in the trade as a baghouse and which operates in essentially the same manner as an ordinary household vacuum cleaner. The baghouse includes a sheet metal housing divided into two chambers, referred to as plenums, by one or more tube sheets. Disposed within openings communicating with the plenums are filters in the form of bags constructed of a suitable fabric. A particle laden gas stream, induced by the action of a fan, flows into one chamber (dirty air plenum) where dust accumulates on the filter bags as the gas passes through the fabric into the other chamber (clean air plenum) and out the exhaust.

Although all baghouses are designed in accordance with the foregoing general principles, there are numerous operational and structural distinctions. For example, one type of baghouse referred to as an inside collection baghouse effects filtration from inside of the filter bags to the outside. In another type of baghouse known as an outside collection baghouse, filtration occurs from outside to inside such that the particulate matter collects on the outside surfaces of the filter bags. The present invention is directed particularly to outside collection baghouses.

The filter bags eventually become worn and develop leaks which hamper their effectiveness in filtering particulate matter from the gas. It is normal practice to regularly replace the entire array of filter bags at scheduled intervals since the majority of the bags reach the end of their useful life at approximately the same time. In addition, there are invariably some bags which become worn prematurely and leak excessively prior to their regularly scheduled replacement. Such defective bags must be quickly located and replaced or repaired in order to maintain the baghouse at peak operating efficiency and in compliance with emissions standards. However, since the baghouse often contains hundreds or even thousands of filter bags, it is extremely difficult to identify the individual bags which are defective.

In the past, it has been the typical practice for maintenance personnel to physically enter the baghouse compartments and visually inspect the filter bags to determine which bags ae defective and then repair or replace them. The time and effort involved in this labor intensive procedure adds significantly to the overall cost of operating the baghouse and to its off-line time, as well as increasing the risk of physical injury to the maintenance crew due to the hostile conditions encountered in the baghouse and the lengthy time periods during which the workers must be physically present therein. Furthermore, visual examination of the filter bags often results in some of the defective bags being overlooked due to human error.

It is thus apparent that there is a need to reduce the time, labor, and safety hazards involved in identifying defective filter bags in an industrial baghouse. The primary goal of the present invention is to meet that need.

More specifically, it is an object of the invention to provide, in an outside collection baghouse, a method and apparatus for quickly and precisely identifying each individual filter bag which leaks to an unacceptable extent.

Another object of the invention is to provide a method and apparatus which takes advantage of the properties of optical glass fibers to monitor the amount of particulate matter contained in a gas stream. The optical glass fibers are able to withstand the high temperatures and other severe conditions that are often encountered within baghouses and in other hostile environments.

Yet another object of the invention is to provide a method and apparatus of the character described which is well adapted for use with a conventional outside collection baghouse without requiring significant modification of the baghouse structure. In this respect, it is important to note that the sensing heads which monitor the bag leakage are conveniently mounted to an existing manifold pipe forming part of the built in cleaning system of the baghouse.

A further object of the invention is to provide a method and apparatus of the character described wherein each individual filter bag can be monitored on a substantially continuous basis to provide a history of the condition of each bag. This faclitates preventive maintenance and decreases the down time of the baghouse, in that bags which are likely to fail can be identified and replaced or repaired prior to actual failure and during regularly scheduled maintenance operations.

An additional object of the invention is to provide an apparatus of the character described which is simple and economical to construct and install.

Other and further objects of the invention, together with the features of novelty appurtenant thereto, will appear in the course of the following description.

DETAILED DESCRIPTION OF THE INVENTION

In the accompanying drawings which form part of the specification and are to be read in conjunction therewith and in which like reference numerals are used to indicate like parts in the various views:

FIG. 1 is a top plan view of one section of an industrial baghouse which is equipped with a leak detection system in accordance with a preferred embodiment of the present invention, a portion of the cover panel of the baghouse section being broken away for purposes of illustration;

FIG. 2 is an enlarged fragmentary elevational view of a single sensing head taken generally along line 2—2 of FIG. 1 in the direction of the arrows;

FIG. 3 is a fragmentary sectional view on an enlarged scale taken generally along line 3—3 of FIG. 2 in the direction of the arrows;

Figure 4:
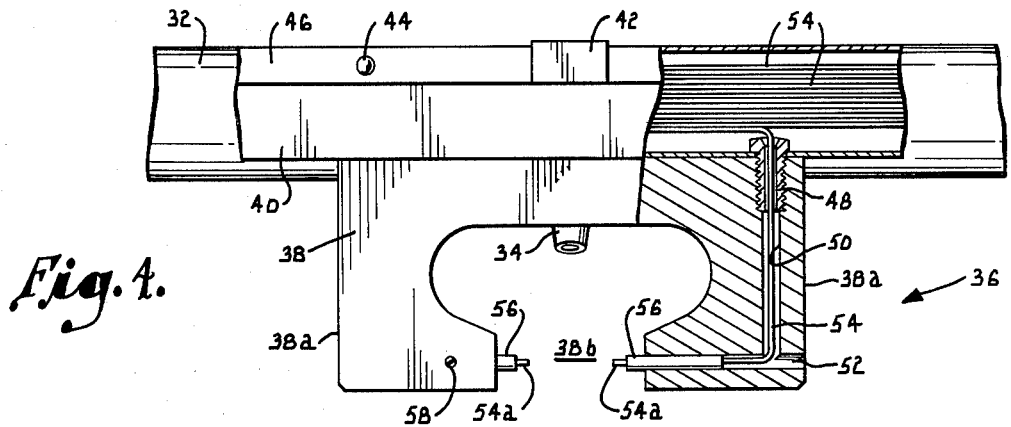
FIG. 4 is a fragmentary elevational view taken generally along line 4—4 of FIG. 3 in the direction of the arrows, with portions broken away for purposes of illustration.

Referring now to the drawings in detail and initially to FIG. 1, reference numeral 10 generally designates one section of an industrial baghouse which includes a box-like housing 12 formed of sheet metal or a similar material. Mounted within housing 12 is a horizontal tube sheet 14 which divides the baghouse into an upper chamber and a lower chamber. The chamber located above tube sheet 14 is referred to as a clean air plenum 16 (FIG. 2), while the chamber located beneath the tube sheet is known as a dirty air plenum 18. The dirty air plenum 18 has an inlet port (not shown) for receiving a particle laden gas stream which is to be filtered by the baghouse. An outlet conduit 20 (FIG. 1) connects with the clean air plenum 16 in order to exhaust clean air from the baghouse. A removable cover panel 22 closes the top of housing 12 to form a cover for the baghouse unit.

Referring now particularly to FIGS. 2 and 3, tube sheet 14 supports a plurality of filter bags 24 which are formed of a suitable fabric capable of effectively filtering particulate matter from the gas stream. Filter bags 24 are arranged in a plurality of rows and columns and extend through suitable round openings formed in tube sheet 14. The top end 24a of each filter bag is folded over an upstanding collar (not shown) which extends around the tube sheet opening. Each bag 24 has an open mouth portion 24b at its top end which receives a diffuser 26 having a plurality of fingers 26a extending downwardly against the outside surface of bag portion 24a. A clamping band 28 is secured around fingers 26a. Skeletal support for each bag 24 is provided by a wire cage (not shown). It should be noted that other types of filter bag assemblies may be employed in the baghouse without departing from the scope of the present invention.

The particulate matter which collects on the outside surfaces of filter bags 24 is periodically dislodged from the bags by a cleaning system which includes a compressed air header pipe 30 which is mounted to housing 12 a short distance above tube sheet 14 within clean air plenum 16. Extending at right angles from header pipe 30 are manifold pipes 32 which extend above each row of filter bags. Each manifold pipe 32 has a series of orifices or nozzles 34 (FIG. 3) which are located directly above the mouths 24b of the respective filter bags 24. Cleaning air is intermittently forced though header pipe 30 and manifold pipes 32 and is discharged through nozzles 34 into the mouths of the filter bags. The jet of air discharged by each nozzle 34 flows into the interior of the corresponding filter bag and through the fabric in order to dislodge particulate matter from the outside surface of the bag.

As thus far described, baghouse 10 is constructed in a conventional manner. In accordance with the present invention, each filter bag 24 is equipped with a sensing head 36 which serves to detect the amount of particulate matter leaking through the corresponding bag 24. Each sensing head 36 includes a bracket 38 which is secured at its top end to a horizontal conduit 40. There is one conduit 40 secured to the side of each manifold pipe 32, and each conduit 40 mounts a plurality of brackets 38 equal in number of the number of filter bags 24 in the row. Each conduit 40 is secured to a plurality of mounting brackets 42 which are each welded or otherwise attached to conduit 40 at one end and to manifold pipe 32 at the opposite end. Rivets 44 attach a cover portion 46 over the top of each conduit 40.

As best shown in FIG. 4, each bracket 38 has a pair of spaced apart arm portions 38a on opposite sides of an opening 38b. A pair of bolts 48 (one of which is shown in FIG. 4) mount each bracket 38 to conduit 40. Bolts 48 are threaded from within conduits 40 into internally threaded upper portions of passages 50 formed within each arm portion 38a. A horizontal passage 52 intersects with the bottom end of each passage 50.

A bundle of optical fibers 54 is contained within each conduit 40, and each bolt 48 has a passage therethrough which receives one of the optical fibers 52. The optical fiber is extended through bolt 48 and passages 50 and 52 such that a free end 54a of the optical fiber extends into opening 38b. A sheath 56 is sleeved over each optical fiber and fitted closely in passage 52 to maintain end portion 54a at an exposed position in opening 38b. A set screw 58 is threaded into each arm 38a and against sheath 56 to secure the optical fiber in position while permitting adjustment of its free end 54a.

As used herein, the term "optical fiber" means an optical glass transmitter for transmitting light and may comprise one or a plurality of solid glass strands.

It is thus apparent that each bracket 38 has a pair of optical fibers 54 which extend through the two arms 38a of the bracket and have their free end portions 54a aligned with one another in spaced apart relationship and positioned above the discharge of the corresponding filter bag 24. The ends of fibers are encased in an epoxy and polished in the manner of a lens. The spacing between each pair of ends 54a is important to proper operation of the invention and may be varied by means of the adjustment provided by set screws 58. In a typical baghouse, the spacing between ends 54a is preferrably in the range of approximately 1½" to 2". Ends 54a are positioned actually in the gas stream passing through mouth 24b near opposite sides thereof.

Figure 5:
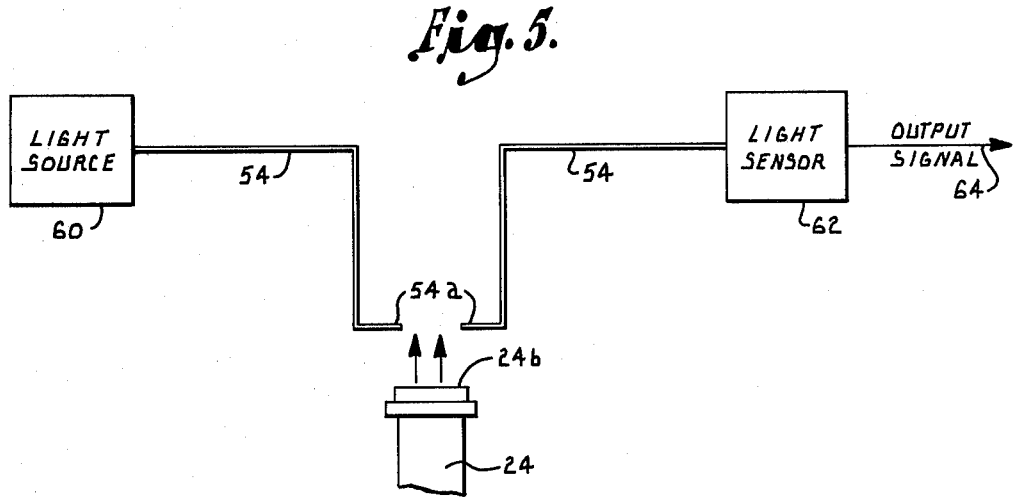
FIG. 5 is a schematic diagram of the leak detection system.

As illustrated schematically in FIG. 5, one optical fiber 54 in each pair serves as a light transmitter and has its opposite free end 54a connected with a light source 60. Light source 60 may be a conventional unit such as a high-intensity incandescent light, LED (light emitting diode) or laser-type light which applies light to the adjacent optical fiber 54. The other optical fiber 54 in each pair serves as a light receiver and is connected with a light sensor 62 which is likewise a conventional unit that receives light from the adjacent optical fiber. Preferably, sensor 62 provides an electrical output signal 64 which is proportional to or otherwise related to the amount of light reaching the sensor. The output signal 64 from each sensing unit 36 is preferably applied to a micro-computer system or the like (not shown).

In use, baghouse 10 operates in a well known manner to filter particulate matter from an incoming gas stream which is laden with dust and other foreign material. The gas is drawn into dirty air plenum 18 by a fan (not shown) and is forced upwardly through the fabric filter bags 24 from the outside of the bags to the open interior regions thereof and then out through the open mouths 24b of the filter bags into the clean air plenum 16 from which the gas is discharged through conduit 20. Light source 60 applies light either continuously or intermittently to the transmitter optical fiber in each pair of fibers 54. The light is directed along the length of fiber 54 to its free end 54a and then across the gap between the optical fibers to the free end 54 of the receiver fiber. The light reaching the receiver fiber is then directed along it to light sensor 62 which provides an appropriate output signal 64.

Since the light passing between fiber ends 54a passes substantially across the open mouth 24b of each filter bag, the light impinges on any particulate matter contained in the gas stream flowing out the mouth of the bag. Therefore, the amount of light intercepted by the particulate matter is directly proportional to the amount of particulate matter which leaks through the corresponding filter bag, and the amount of light reaching the receiver fiber, as sensed by sensor 62, provides an indication of the extent to which the bag leaks. The output signal 64 from each sensing head thus provides a measurement of the amount of particulate matter leaking through the bag. The output signal 64 for each individual bag is applied to a microcomputer system or the like which provides a readout of the amount of particulate matter passing through each individual filter bag. The readout identifies the precise location of any bags which leak excessively, and such defective bags are thus located and can be replaced without having to visually inspect the bags which are not defective. Bags which leak to a limited extent are also identified and can be repaired or replaced prior to complete failure.

It is pointed out that only the ends 54a of optical fibers 54 are exposed to the hostile environment within baghouse 10. Since the optical fibers are easily able to withstand the temperatures and other severe conditions within the baghouse, there are no sensitive components exposed to the baghouse environment or components that can cause an electrical spark. Although other types of sensing devices may be used in some situations, optical fibers are preferred because they can be positioned actually in the gas stream without being damaged by the high temperatures and other severe conditions that are encountered or cause an explosion of hazardous and volatile particulate.

It is thus evident that the present invention quickly and accurately identifies defective filter bags and permits them to be repaired or replaced without requiring examination of other bags. This minimizes maintenance requirements while maintaining the baghouse at peak operating efficiency. The micro-computer system can be made to give a readout of the condition of each bag on demand or at scheduled intervals, or both, and it can provide a printed record or history of the condition of each filter bag. If desired, a bag which is beginning to deteriorate can be repaired or replaced prior to actual failure.

Although the invention has been described in connection with filter bags in a baghouse, it is to be understood that it may be used to detect the amount of particulate matter contained in any flowing gas stream. The invention finds particular utility in hostile environments due to the ability of the optical fibers to function effectively as sensors under severe conditions. Other types of sensors cannot be positioned actually within the gas stream without being destroyed or made ineffective by the particulate matter which can collect on the sensor and adversely affect its accuracy.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A method for detecting leakage during flow conditions of particulate matter through a filter bag used to filter a particle laden gas stream which is passed through the bag from the outside thereof into an open interior region of the bag and then out through an open end of the bag, said method comprising the steps of:

continuously directing a light beam across the path of the gas stream flowing out the open end of the filter bag to effect impingement of the light beam on the particulate matter contained in the gas stream flowing through the open end of the bag, whereby the amount of light passing across the open end of the bag is dependent upon the amount of particulate matter leaking through the filter bag; and continuously sensing the amount of light passing across the open end of the filter bag to thereby detect the amount of particulate matter leaking through the bag.

2. A method as set forth in claim 1, wherein said step of directing a light beam across the path of the gas stream comprises (a) providing a pair of optical fibers each having a free end portion, (b) aligning the free end portions of the optical fibers with one another on opposite sides of the gas stream passing through the open end of the bag, and (c) applying light to one of the optical fibers in a manner to direct the light along said one fiber and between said free end portions to the other optical fiber, said sensing step comprising the step of sensing the amount of light passing along said other optical fiber.

3. A method as set forth in claim 1, wherein said step of directing a light beam across the path of the gas stream includes the steps of (a) providing a pair of optical fibers each having a free end portion, (b) arranging the free end portions of the optical fibers in spaced apart and aligned relation in proximity to the open end of the bag within the gas stream passing therethrough, and (c) applying light to one of the optical fibers in a manner to direct the light along said one fiber and between said free end portions to the other optical fiber, said sensing step comprising sensing the amount of light passing along said other optical fiber.

4. In an outside collection baghouse for filtering particulate matter from particle laden gas by forcing the gas through a plurality of individual filter bags from outside of the filter bags into open interior regions thereof and then out through open mouths of the bags, a method for identifying defective filter bags comprising individually sensing for each filter bag the amount of particulate matter passing through the mouth of the bag to thereby detect the amount of particulate matter leaking through each individual filter bag, wherein said sensing step comprises directing a plurality of light beams substantially across the mouths of the respective filter bags to effect impingement of the light on particulate matter in the gas flowing out the mouths of the individual bags, and detecting the amount of light which passes across the mouth of each individual filter bag, thereby sensing the amount of particulate matter leaking through each individual filter bag.

5. In an outside collection baghouse for filtering particulate matter from particle laden gas by forcing the gas through a plurality of individual filter bags from outside of the filter bags into open interior regions thereof and then out through open mouths of the bags, a method for identifying defective filter bags comprising individually sensing for each filter bag the amount of particulate matter passing through the mouth of the bag to thereby detect the amount of particulate matter leaking through each individual filter bag, wherein said sensing step comprises:

providing a pair of optical fibers for each filter bag with each fiber having a free end portion;

aligning the free end portions of each pair of optical fibers at locations in proximity to the mouths of the respective filter bags wherein the gas flowing out the mouth of each bag passes between the free ends of the corresponding pair of optical fibers;

directing light along one of the optical fibers in each pair and between said free end portions to the other optical fiber in each pair; and detecting the amount of light passing along said other optical fiber in each pair.

6. In a baghouse having a housing, a tube sheet dividing the housing into dirty and clean air plenums between which particle laden gas is forced for filtration of particulate matter from the gas, and a plurality of filter bags mounted to the tube sheet with an outside surface of each bag exposed to the dirty air plenum and a mouth of each bag exposed to the clean air plenum, the combination of:

a sensing head for each filter bag, said sensing heads being supported within the clean air plenum in proximity to the mouths of the respective filter bags; and sensing means associated with each sensing head for sensing the amount of particulate matter passing through the mouth of the corresponding filter bag, thereby measuring the leakage rate through each individual filter bag.

7. The invention set forth in claim 6, wherein said sensing means includes:

means for directing a beam of light substantially across the mouth of each filter bag to effect impingement of light on the particulate matter passing through the mouth of each bag; and means for detecting the amount of light which passes across the mouth of each individual filter bag, thereby providing a measurement of the amount of particulate matter leaking through each individual filter bag.

8. The invention set forth in claim 6, wherein said sensing means includes:

a pair of optical fibers for each sensing head, each optical fiber having a free end portion with the end portions of the optical fibers in each pair being mounted on the corresponding sensing head in spaced apart and aligned relation at locations wherein the gas flowing out the mouth of the corresponding filter bag passes between said end portions;

a light source for applying light to one optical fiber in each pair in a manner to direct light along said one optical fiber and between said end portions to the other optical fiber in each pair; and light sensing means coupled with said other optical fiber in each pair for sensing the amount of light applied to said other optical fiber, thereby measuring the amount of particulate matter leaking through each individual filter bag.

9. The invention set forth in claim 8, including means for adjusting the distance between each pair of end portions.

10. The invention set forth in claim 6, wherein the baghouse has a cleaning system for the filter bags which includes a plurality of pipes mounted in the housing in extension above the filter bags, said sensing heads being mounted on said pipes.

* * * * *

UNITED STATES PATENT AND TRADEMARK OFFICE
CERTIFICATE OF CORRECTION

PATENT NO. : 4,304,492

DATED : December 8, 1981

INVENTOR(S) : Bill K. Fox et al

It is certified that error appears in the above—identified patent and that said Letters Patent is hereby corrected as shown below:

On the title page Item (75) should read:

-- Bill K. Fox, Kansas City, Mo., David Stephens, Lenexa, Kansas and Jack T. Clements, Raytown, Mo. --

Signed and Sealed this

Thirtieth Day of March 1982

[SEAL]

Attest:

Attesting Officer

GERALD J. MOSSINGHOFF

*Commissioner of Patents and Trademarks*